United States Patent [19]

Campbell et al.

[11] 4,016,726
[45] Apr. 12, 1977

[54] CONNECTOR HINGE FOR OIL CONTAINMENT BOOMS

[75] Inventors: Francis J. Campbell, Stanford; Douglas J. Graham, San Francisco, both of Calif.

[73] Assignee: The United States of America as represented by the Secretary of the Navy, Washington, D.C.

[22] Filed: Aug. 21, 1975

[21] Appl. No.: 606,696

[52] U.S. Cl. .................................................. 61/1 F
[51] Int. Cl.² ........................................ E02B 15/04
[58] Field of Search ........... 61/1 F, 5; 210/DIG. 21, 210/242

[56] References Cited

UNITED STATES PATENTS

| 3,744,253 | 7/1973 | Williams et al. | 61/1 F |
|---|---|---|---|
| 3,766,738 | 10/1973 | Gauch | 61/1 F |
| 3,925,991 | 12/1975 | Poche | 61/1 F |

FOREIGN PATENTS OR APPLICATIONS

| 54,003 | 6/1922 | Sweden | 61/1 F |

*Primary Examiner*—Paul R. Gilliam
*Assistant Examiner*—David H. Corbin
*Attorney, Agent, or Firm*—Richard S. Sciascia; Joseph M. St. Amand; William W. Cochran, II

[57] ABSTRACT

A connector hinge for attaching oil spill containment booms having a male cylindrical connector which fits loosely within a female cylindrical connector to allow easy movement of both connectors in both a vertical and horizontal direction. A resilient gasket is disposed within the male cylindrical connector such that the gasket forms an oil-tight seal between the male connector and female connector. The female connector is tapered along its length to allow easy disposition of the male member within its cylindrical cavity. Both the male and female connectors can be attached to a floating oil spill containment boom, a substantially immovable object such as a pier or jetty, or a floating tow assembly. The loose fit between the male and female connectors allows the connector hinge to adjust to tidal variations as well as additionally aiding in placement of the male connector within the female connector. The gasket material is formed of foam rubber, rubber, or any other suitable resilient material capable of forming an oil-tight seal. The gasket is formed in either a rectangular shape or beaded to aid in securing the gasket to the male connector.

16 Claims, 6 Drawing Figures

CONNECTOR HINGE FOR OIL CONTAINMENT BOOMS

BACKGROUND OF THE INVENTION

The present invention relates generally to oil containment boom hardware and more specifically to oil containment boom connectors. Oil containment booms are often used to confine oil spills on the open sea. Since oil spills vary greatly in size and shape, oil containment hinges must facilitate rapid shortening or lengthening of the oil containment boom. Oil containment booms have therefore conventionally been broken into sections and provided with connectors which are flexible and allow the boom to form around the oil spill in any desired length. Conventional oil containment boom connectors, however, suffer from many disadvantages and limitations. For example, a conventional oil containment boom connector has been developed by the Flexy Oil Boom Company which has a socket and bead connection that allows horizontal displacement of the oil containment boom for shore attachment of one of the connectors to a pier or other stationary object. The shore attachment connector allows the oil containment boom to be attached to a stationary object but does not allow the floating section of the boom to follow tidal variations. Furthermore, although the Flexy Oil Boom connectors are simply constructed and inexpensive to manufacture, they are not easily assembled since the bead is made to fit tightly within the socket such that oil does not leak through the connection. If the bead is made smaller to allow easy assembly, the connection is found to leak oil. Therefore, the Flexy Oil Boom connector has been found to either leak oil or is fairly hard to assemble and, in any event, does not adjust to tidal variations.

Other prior art oil containment boom connectors have not shown the simplicity of design of the socket and bead connector and have relied on complex mechanical devices which are costly and unreliable or more simply designed devices which require an assembly procedure which is lengthy and difficult to carry out in open sea conditions.

SUMMARY OF THE INVENTION

The present invention overcomes the disadvantages and limitations of the prior art by providing an improved oil containment boom connector. Although the oil containment boom connector of the present invention is similar to the conventional socket and bead connector, the bead portion of the connector constitutes a hollowed, cylindrical portion having a slot along its length and designed in the same manner as the socket or female connector portion. The bead or male connector portion is formed in a size to allow loose attachment between it and the female connector, to aid assembly and to allow the oil containment boom to easily adjust for tidal variations. To prevent oil from leaking through the connection, a resilient gasket is connected to the male connector portion, which forms an oil-tight seal between the male connector portion and the female connector portion upon assembly. To further aid in assembly of the device, the female connector portion is tapered such that is is extruded at the top to allow a greater area for disposition of the male connector portion.

It is therefore an object of the present invention to provide an improved oil containment boom connector.

It is also an object of the present invention to provide an inexpensive and simply designed oil containment boom connector.

Another object of the invention is to provide an oil containment boom connector which is reliable in operation.

Another object of the present invention is to provide an oil containment boom connector which is quick and simple to assemble on the open ocean.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art. Additionally, the foregoing abstract of the disclosure if for the purpose of providing a non-legal brief statement to serve as a searching and scanning tool for scientists, engineers and researchers, and is not intended to limit the scope of the invention as disclosed herein, nor is it intended that it should be used in interpreting or in any way limiting the scope or fair meaning of the appended claims.

DETAILED DESCRIPTION OF THE PREFERRED EMBODIMENT

Figure 1:
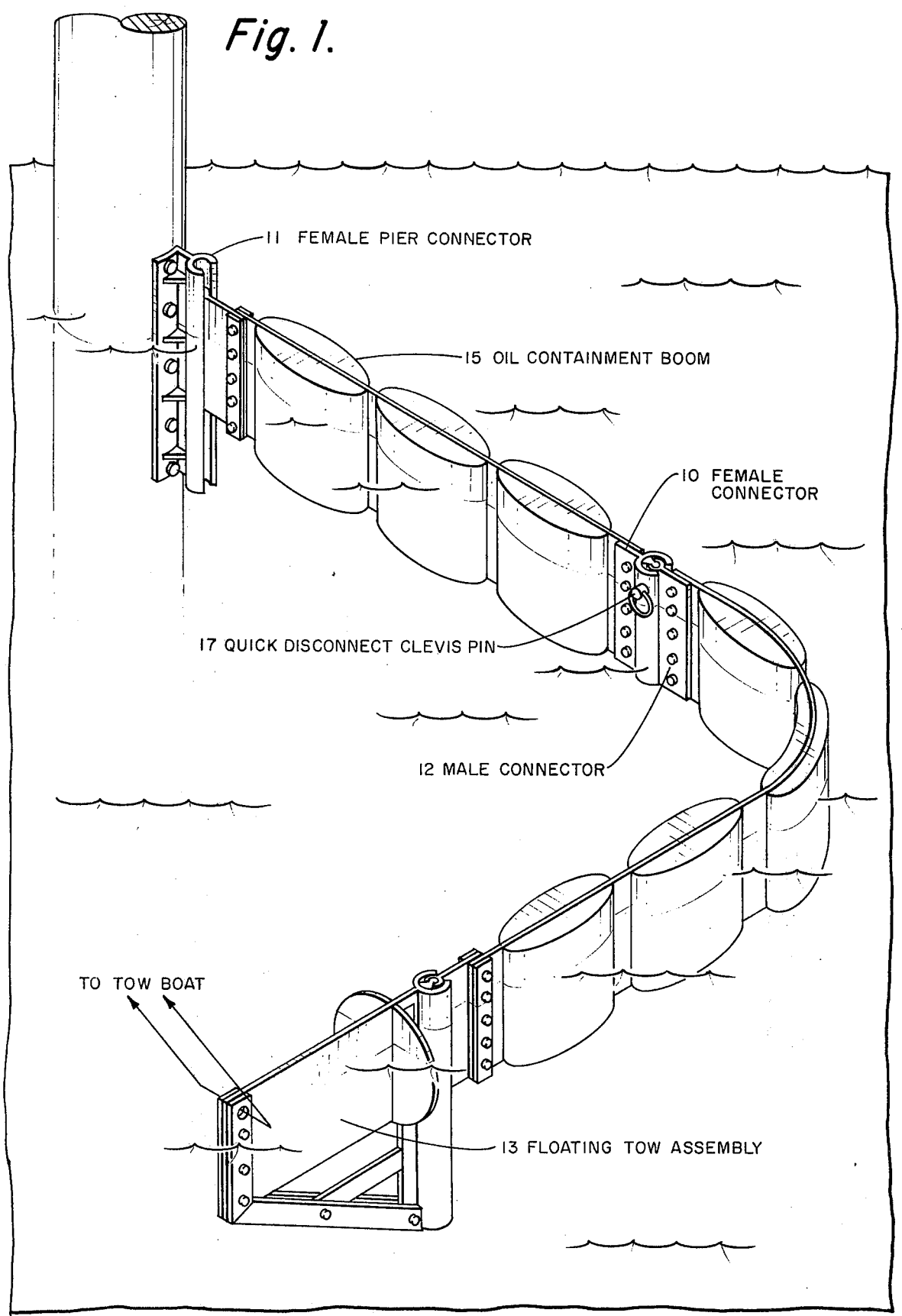
FIG. 1 is a diagram of an oil containment boom and its appurtenant hardware.

FIG. 1 is an illustration of a typical oil containment boom utilizing the connectors of the preferred embodiment of the invention. As shown in FIG. 1, female connector 10 and male connector 12 are each connected to an oil containment boom. Quick disconnect clevis pin 17 prevents sliding of male connector 12 within the female connector 10. The connector hinge comprising female connector 10 and male connector 12 allows numerous oil containment booms, such as oil containment boom 15, to be rapidly connected and disconnected to contain an oil spill on the open sea.

Female pier connector 11 is an extended section of the female connector 10, which can be attached to a stationary object such as a pier. The female pier connector 11 and male connector inserted therein provide a connection which allows adjustment of the oil containment boom 15 with tidal variations due to their loose assembly. Floating tow assembly 13 is connected to the last oil containment boom of the series of oil containment booms 15 and serves to guide the series of oil containment booms around the oil spill for proper confinement.

Figure 2:
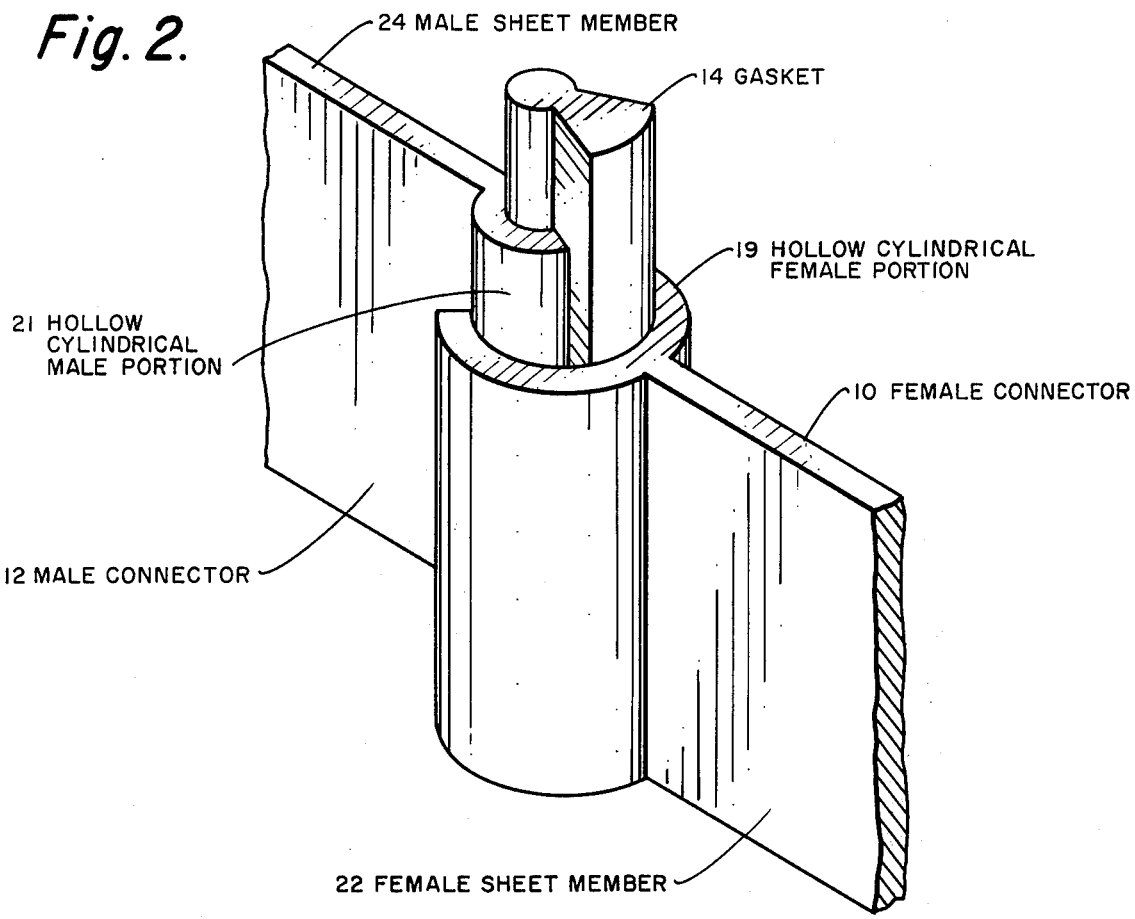
FIG. 2 is a perspective drawing of the oil containment boom connector comprising the preferred embodiment of the invention.

FIG. 2 is a diagram of the connector section as shown in FIG. 1. Female connector 10 comprises a hollow, cylindrical female portion 19 and a female sheet member 22, which can be attached to either a stationary object, an oil containment boom or a floating tow assembly. A female connector 10 has a slot in the hollow, cylindrical female portion 19 extending along its longitudinal axis opposite the connection of the female sheet member 22 to the hollow, cylindrical female portion 19. The slot in the hollow, cylindrical female portion 19 is large enough to allow disposition of the male connector 12 within the female connector and to additionally allow rotation of the male connector around the axis of the hollow, cylindrical female portion 19 to allow horizontal displacement of the oil containment boom.

Male connector 12 comprises a hollow, cylindrical male portion 21 and a male sheet member 24. Hollow, cylindrical male portion 21, similar to hollow, cylindrical female portion 19, has a slot extending along its longitudinal axis opposite the connection of the male sheet member 24. The cylindrical male portion 21 is formed in a size such that it is easily disposed within the hollow, cylindrical female portion 19 of female connector 10. Gasket 14 is positioned within the slot and cylindrical portion of hollow, cylindrical male portion 21 to hold it firmly in place within the male connector 12. Gasket 14 is formed of resilient gasket material and is positioned to form an oil-tight seal between the hollow, cylindrical female portion 19 and the hollow, cylindrical male portion 21, thereby forming an oil-tight connector hinge.

Figure 3:
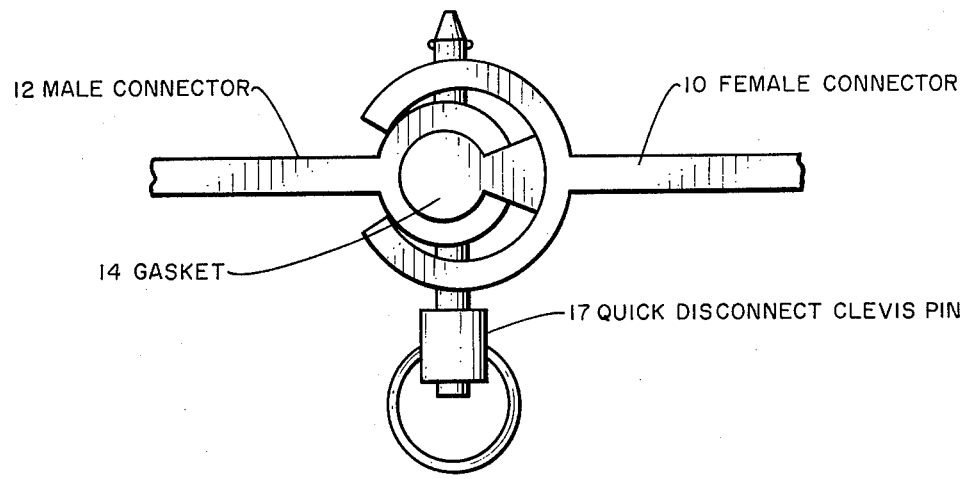
FIG. 3 is a top view of the connector of the preferred embodiment of the invention and also illustrates the quick disconnect clevis pins comprising another aspect of the invention.

FIG. 3 is a top view of the connector hinge of the preferred embodiment clearly showing the connection of the male connector 12 and female connector 10. Quick disconnect clevis pin 17 additionally provides a means for securing the male connector 12 and the female connector 10. As shown in FIG. 3, gasket 14 is pushed tightly against the female cylindrical portion to stop leakage of oil through the connector hinge.

Figure 4:
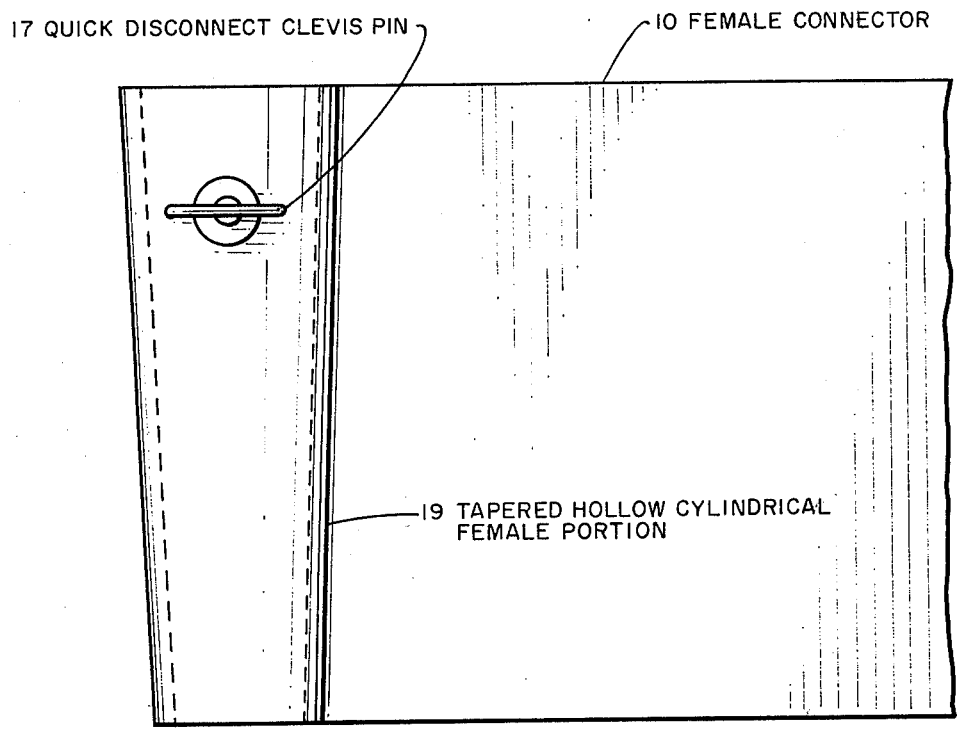
FIG. 4 is a side view of the preferred embodiment of the invention as shown in FIG. 3.

FIG. 4 is a side view of the connector hinge of the preferred embodiment. As shown in FIG. 4, the hollow, cylindrical female portion 19 has been tapered such that the upper portion is extruded to allow easy insertion of the male connector 12. This allows easy disposition of the cylindrical male portion within the female portion when working in an ocean environment where ease in handling is of utmost importance. Additionally, it allows the male connector 12 to slide easily within the female connector 10 such that when the male sheet member 24 of the male connector 12 is connected to an oil containment boom, the oil containment boom will easily follow tidal variations.

Figure 5:
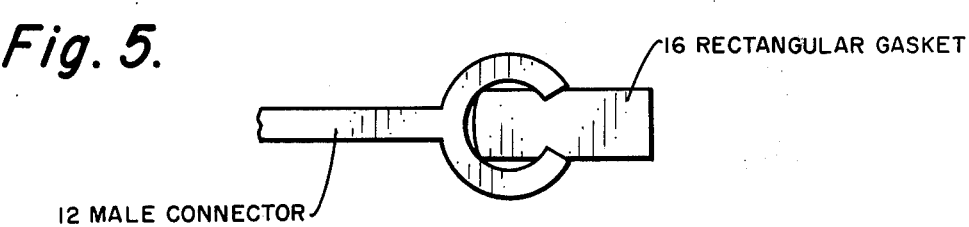
FIG. 5 is a top view of the male connector of the preferred embodiment of the invention and an alternative gasket connected thereto.

FIG. 5 discloses an alternative gasket design for use with the male connector 12. As shown, a rectangular gasket 16 is positioned within the hollow portion of the hollow, cylindrical male portion 21. The rectangular gasket 16 is made of a resilient material such that it is easily disposed within the male connector 12 and can be held in that position tightly to form an oil-tight seal.

Figure 6:
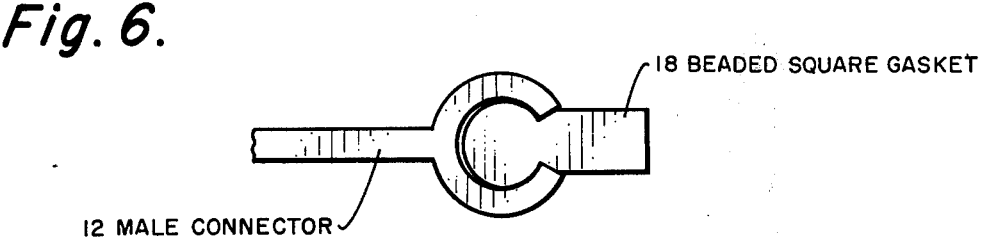
FIG. 6 also illustrates the male connector of the preferred embodiment with another alternative gasket connected thereto.

FIG. 6 discloses another alternative gasket for use within the male connector 12. As shown in FIG. 6, a beaded, square gasket 18 is formed to securely fit within the hollow, cylindrical male portion 21 of male connector 12, and is thereby securely held in place.

The gaskets, as shown, can be formed of any resilient material which forms an oil-tight seal such as rubber or foam rubber. However, it must be resilient enough to allow easy sliding of the male member within the female member for initial assembly and also to adjust for tidal variations.

The present invention therefore provides an uncomplicated and simply constructed connector hinge which is inexpensive to manufacture and reliable in operation. Its design provides for ease in assembly in an open sea environment in a rapid manner while also providing an oil-tight seal within the connector hinge.

Although the invention has been described with reference to a specific embodiment, it will be appreciated that the concepts of this invention can be practiced with equivalent structures and methods and that all equivalent structures and methods to those disclosed herein are intended to be included within the scope of the protection being sought.

What is claimed is:

1. In combination with an oil spill containment boom, a connector hinge comprising:
   a. a hollow cylindrical female portion tapered along its length and longitudinally attached to a first sheet member, said hollow cylindrical female portion having a slot extending along its longitudinal axis opposite said longitudinally attached first sheet member;
   b. a hollow cylindrical male portion longitudinally attached to a second sheet member and formed to fit loosely within said hollow cylindrical female portion, said hollow cylindrical male portion having a slot extending along its longitudinal axis opposite said longitudinally attached second sheet member;
   c. a resilient gasket disposed in said hollow cylindrical female portion and extending through said slot of said hollow cylindrical male portion, said resilient gasket positioned in said hollow cylindrical male portion to form an oil-tight seal between said hollow cylindrical female portion and said cylindrical male portion, said cylindrical male portion being disposed within said cylindrical female portion forming said connector hinge;
   d. wherein said hollow cylindrical female portion is tapered to aid in disposition of said cylindrical male portion within said cylindrical female portion and formed with a cavity having a size which allows said male member to move freely along the length of the female portion thereby permitting said oil spill containment booms to follow tidal variations.

2. The connector hinge of claim 1 wherein said resilient gasket is formed of foam rubber.

3. The connector hinge of claim 1 wherein said resilient gasket is formed of rubber.

4. The connector hinge of claim 1 wherein said resilient gasket is beaded along one side of its length to securely hold it within said slot of said cylindrical male portion.

5. The connector hinge of claim 1 wherein said resilient gasket comprises a square gasket.

6. The connector hinge of claim 1 wherein said resilient gasket comprises a beaded square gasket.

7. The connector hinge of claim 1 wherein said first and second sheet members are attached to oil spill containment booms.

8. The connector hinge of claim 7 wherein said resilient gasket is formed of foam rubber.

9. The connector hinge of claim 7 wherein said resilient gasket is formed of rubber.

10. The connector hinge of claim 7 wherein said resilient gasket is beaded along one side of its length to securely hold it within said slot of said cylindrical male portion.

11. The connector hinge of claim 1 wherein said first sheet member is attached to a substantially immovable object.

12. The connector hinge of claim 1 wherein said first sheet member is attached to a floating tow assembly.

13. In combination with an oil spill containment boom, a
  a. hollow cylindrical female means tapered along its length and longitudinally attached to a first sheet member, said hollow cylindrical female means having a slot extending along its longitudinal axis opposite said longitudinally attached first sheet member;
  b. hollow cylindrical male means longitudinally attached to a second sheet member and formed to fit loosely within said hollow cylindrical female means, said hollow cylindrical male means having a slot extending along its longitudinal axis opposite said longitudinally attached second sheet member;
  c. resilient gasket means disposed in said hollow cylindrical female means and extending through said slot of said hollow cylindrical male means forming an oil-tight seal between said hollow cylindrical female means and said cylindrical male means, said cylindrical male means being disposed within said cylindrical female means forming said connector hinge;
  d. wherein said hollow cylindrical female means is tapered to aid in disposition of said cylindrical male means within said cylindrical female means.

14. The connector hinge of claim 13 wherein said resilient gasket is formed of rubber.

15. The connector hinge of claim 13 wherein said resilient gasket is formed of foam rubber.

16. The connector hinge of claim 13 wherein said first and second sheet members are attached to oil spill containment booms.

* * * * *